United States Patent [19]
Sockut et al.

[11] Patent Number: 5,721,915
[45] Date of Patent: Feb. 24, 1998

[54] INTERACTION BETWEEN APPLICATION OF A LOG AND MAINTENANCE OF A TABLE THAT MAPS RECORD IDENTIFIERS DURING ONLINE REORGANIZATION OF A DATABASE

[75] Inventors: Gary Howard Sockut, San Jose; Thomas Abel Beavin, Milpitas, both of Calif.

[73] Assignee: International Business Machines Corporation, Armonk, N.Y.

[21] Appl. No.: 457,150

[22] Filed: Jun. 1, 1995

Related U.S. Application Data

[63] Continuation of Ser. No. 366,564, Dec. 30, 1994.
[51] Int. Cl.$^6$ .................................................. G06F 17/30
[52] U.S. Cl. .......................... 395/616; 395/617; 395/618; 395/202
[58] Field of Search ..................... 364/413.01; 395/616, 395/617, 618, 202, 600

[56] References Cited

U.S. PATENT DOCUMENTS 5,307,262  4/1994  Ertel .................................... 364/413.01

OTHER PUBLICATIONS

R.A. Crus, "Data Recovery in IBM Database 2", IBM Systems Journal, vol. 23, No. 2, 1984.
C. Mohan, "Algorithms for Creating Indexes for Very Large Tables Without Quiescing Updates", ACM Sigmod, 1992.
Scheuermann, "Concurrent File Reorganization for Record Clustering: A Performance Study", IEEE 1992.
Omiecinski et al, "Performance Analysis of a Concurrent File Reorganization Algorithm for Record Clustering", IEEE Transactions vol. 6, No. 2 Apr. 1994.

Wiener et al., "Bulk Loading into an OODB: A Performance Study," Proceedings of the 20th VLDB Conference, Santiago, Chile, 1994, pp. 120-131.

Performance Analysis of a Concurrent File Reorganization Algorithm for Record Clustering, *IEEE Transactions on Knowledge and Data Engineering*, vol. 6, No. 2, pp. 248-257, Apr. 1994.

Concurrent File Reorganization for Record Clustering: A Performance Study, *IEEE*, pp. 265-272, Jul. 1992.

*Data Recovery in IBM Database 2, IBM Systems Journal,* vol. 23, No. 2, pp. 178-188, 1984.

C. Mohan and Inderpal Narang, *Algorithims for Creating Indexes for Very Large Tables Without Quiescing Updates,* Database Technology Institute, pp. 361-370, Jun. 1992.

*Primary Examiner*—Thomas G. Black
*Assistant Examiner*—Cheryl R. Lewis
*Attorney, Agent, or Firm*—Sterne, Kessler, Goldstein & Fox P.L.L.C.; Marilyn Smith Dawkins, Esq.

[57] ABSTRACT

The present invention includes reorganization of a Database Management System (DBMS) The reorganization of the present invention is implemented by recording a first current Relative Byte Address (RBA) Then, data is copied from the old area in the table space to a new area in the table space in reorganized form. In the present invention, throughout most of reorganization a user maintains access to the DBMS's normal facilities to read and write to the old area. The DBMS uses its normal facilities to record writing, which occurs during reorganization, in,a log. The reorganization in accordance with the present invention reads the log (that has been written to during reorganization) and processes the log to the new area to bring the new area up to date. This process is performed with the use of a RID mapping table. Finally, at the end of reorganization, the user's access is switched from the old area to the new area.

22 Claims, 6 Drawing Sheets

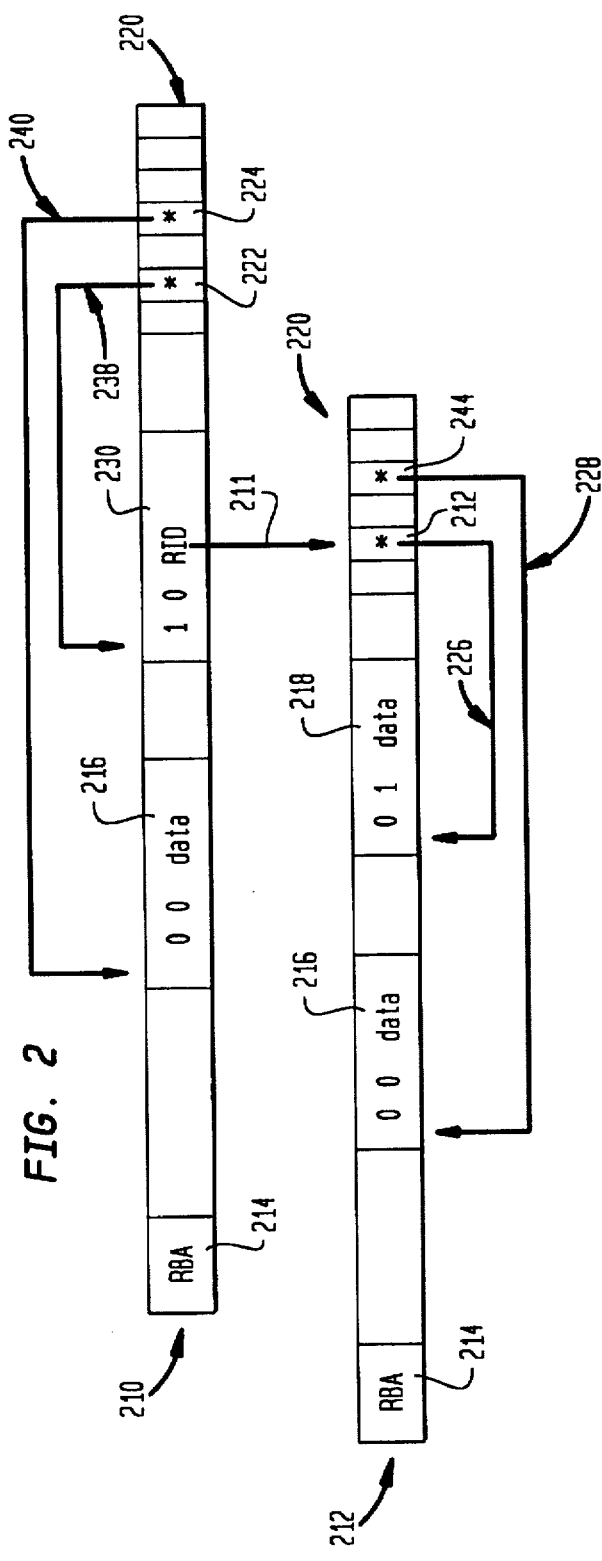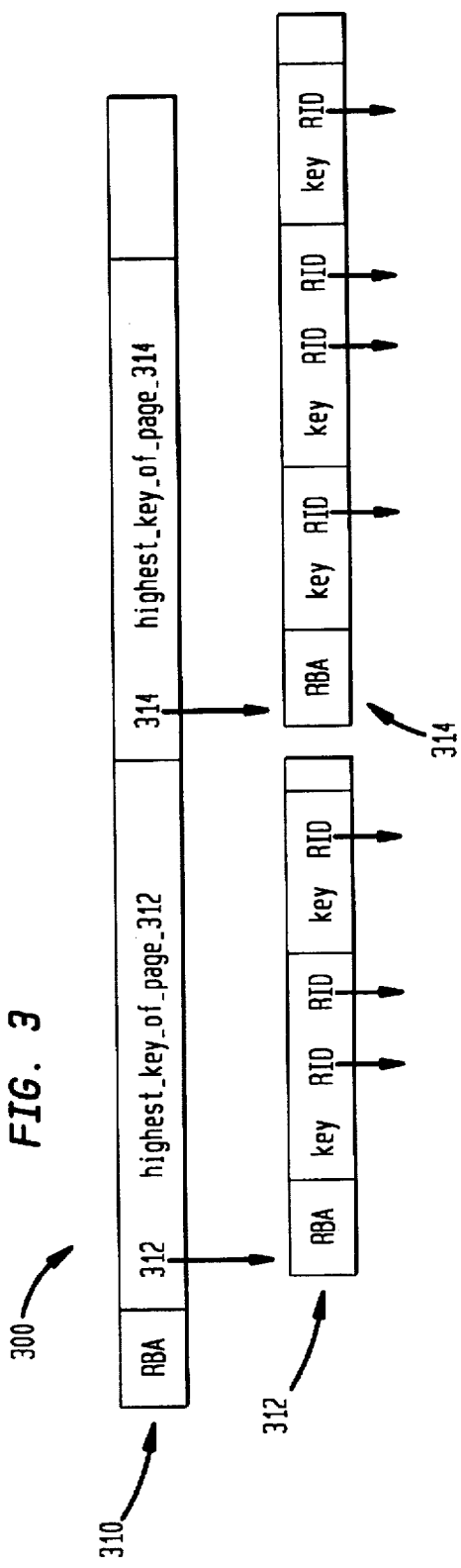

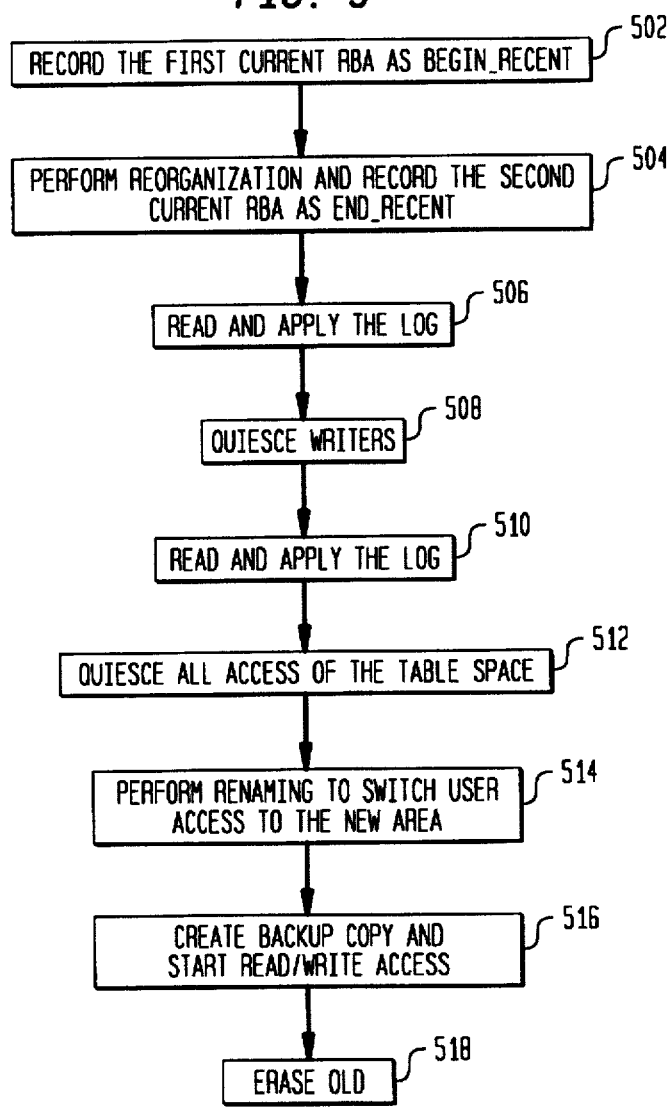

FIG. 6

| TYPE | SOURCE_RID | TARGET_RID | RBA |
|---|---|---|---|
| CR | RID OF OLD REGULAR OR OVERFLOW | RID OF NEW REGULAR OR POINTER | RBA |
| CE | RID OF OLD REGULAR OR OVERFLOW | ESTIMATED RID OF NEW REGULAR | RBA |
| P | RID OF OLD POINTER | (UNUSED) | RBA |

610

INTERACTION BETWEEN APPLICATION OF A LOG AND MAINTENANCE OF A TABLE THAT MAPS RECORD IDENTIFIERS DURING ONLINE REORGANIZATION OF A DATABASE

This application is a continuation of application Ser. No. 08/366,564, filed Dec. 30, 1994, currently pending.

TECHNICAL FIELD

The invention relates to online reorganization of a database. More particularly, the invention relates to the interaction between the application of a log and maintenance of a table that maps record identifiers (RIDs) during online reorganization of the database.

BACKGROUND ART

Over time and with frequent use, databases often become disorganized. Accordingly, numerous attempts have been made to reorganize such databases. Reorganization of a database includes changing some aspect of the logical and/or physical arrangement of the database. Any database management system (DBMS) will require some type of reorganization. One type of reorganization involves restoration of clustering and removal of overflows. In particular, clustering relates to the storing of instances near each other if they meet certain criteria. One popular criterion is consecutive values of a key. Clustering is intended to reduce disk traffic for instances that a user often accesses in temporal proximity. However, a user's writing may fill data pages, decrease the amount of clustering, and degrade database performance. Accordingly, reorganization may restore performance.

Reorganization is a necessary feature in Database Management Systems (DBMSs). During most types of reorganization in a typical database, the area being reorganized is offline or only partially available. However, with a highly available database (a database that is to be fully available 24 hours per day, 7 days per week), it is undesirable to have the database go offline for significant periods. Database applications that require high availability include reservations, finance (especially global finance), process control, hospitals, police, and armed forces. Even for less essential applications, many database administrators prefer 24-hour availability. Moreover, reorganization of a very large database may require a long offline period for reorganization, which is usually longer than the maximum tolerable offline period. With the increasing sizes of databases, which may contain several terabytes or even petabytes of data, a user will likely experience even a longer offline period. Based on the increasing sizes of databases, as well as, increasing demands by users to have 24 hour database access, the need for online reorganization will very likely increase.

The considerations discussed above call for the ability to reorganize the database online (e.g., concurrently with usage or incrementally within users' transactions), so that users can read and write the database during most or all phases of reorganization. The desire to have this capability is well known. As the amount of information and dependence on computers both increase, the number of very large or highly available databases will increase. Therefore, the importance of online reorganization will increase.

One strategy for online reorganization is called fuzzy reorganization, which involves reorganization by copying. This type of reorganization involves a reorganizer (the process that performs the reorganization) that records a current relative byte address (RBA) of a log. An RBA is a position in the log where a log entry can be written. At any time, the "current" RBA of the log is the position where the next log entry is written. An RBA is sometimes called a log sequence number (LSN). A log consists of a sequence of entries in a file (a region of storage), recording the changes that occur to a database. Then the reorganization copies data from an old (original) area for the table space to a new area for the table space, in reorganized form. Concurrently, users can use the DBMS's normal facilities to read and write the old area, and the DBMS uses its normal facilities to record the writing in a log. The reorganizer then reads the log and applies it to the new area to bring the new area up to date. Then, the reorganizer switches the users' accessing to the new area. In many PBMS's, however, each entry in the log identifies a record by the record's record identifier (RID). As an inherent part of reorganization the RIDs change. Therefore, when applying the log (which uses old RIDS) to the new area (which uses new RIDs), the problem of identification arises.

One way of overcoming this problem of identification is to have every record include a unique identifier that does not change during reorganization. However, it is often undesirable to have a restriction that each record must have a unique identifier that does not change during reorganization.

Another system describes garbage collection for persistent data by copying data and applying the log. See, for example, J. O'Toole et al., "Concurrent Compacting Garbage Collection of a Persistent Heap," Proc. 14th ACM Symp. Operating Syst. Principles, Dec. 1993 (Operating Syst. Review, SIGOPS, Vol. 27, No. 5), pp. 161–174. Each old record has a field that stores the address of the corresponding new record. Processing of the log uses this field to translate addresses in log entries. In a database context (which was not the context for this garbage collection) the technique of storing the address of the new record in the old record has serious disadvantages.

In particular, if a user deletes a record (and the DBMS generates a corresponding log entry) after the reorganizer has copied the record, then the reorganizer will eventually find the log entry, try to use the field to translate an address in the log entry from old to new, and apply the user's deletion in the new area. Between the user's deletion and the reorganizer's processing of the log entry, the DBMS might reuse the space that the deleted record occupied, so the new address may not be safely stored in the old (deleted) record. In addition, a data record is fairly large so the set of all data records can require many pages. Therefore, writing and reading the new addresses in the old data records can involve significant page input/output. Furthermore, storing the new record's address in the old record requires a shared lock while unloading the old record, an exclusive lock while reloading the new record (to write a new address in the old record), and a shared lock while processing the log (to translate the address). Therefore, this technique has a tendency to be slow and limits concurrency in the database. Furthermore, this technique may require extra space (which is permanent) in each data record for the address of the new record.

In contrast to fuzzy reorganization discussed above (which uses copying and a log), Reorganization cam be performed in place (i.e., not by copying). One such strategy uses a table that maps RIDs to translate entries in the leaves of indexes. See, for example, E. Omiecinski et al., "Performance Analysis of a Concurrent File Reorganization Algorithm for Record Clustering," IEEE Trans. Knowledge and Data Engin., Vol. 6, No. 2, Apr. 1994, pp. 248–257. Reorganization in place does not use the log because use of the log is inappropriate here since there is only one copy of data. With this strategy for reorganization in place, each transaction by the user holds its locks until commitment of the transaction. However, this reduces the amount of concurrency in the database.

If each transaction by the user does not hold its locks until commitment of the transaction, reorganization in place is complex, especially if reorganization includes changing the assignment of records to pages, as in restoration of clustering. If a user scans a table space or index, and reorganization moves a record between the already-scanned area and the not-yet-scanned area, it must be assured that the user's scan processes the record exactly once, not twice or never. The feasibility of this approach has not yet been established. In addition, reorganization in place may cause more degradation of user' performance, since this type of reorganization writes (instead of reading) the area that users access.

Furthermore, reorganization may be accomplished by offline reorganization of fine-grained partitions. Specifically, a partition of a table space can be a unit of offline reorganization or other utilities, during usage or offline reorganization of other partitions. With a fine enough granularity of partitioning, offline reorganization of a partition may be fast enough to approximate 24 hour availability. However, making the granularity fine can slow the routing of user' accesses into the appropriate areas and increase the total space required for the partition' storage descriptors. It also increases the probability that areas of growth and areas of shrinkage will be in different partitions. This increase in the probability increases the likely variation among the partition' growth rates, thus increasing the total recommended amount of free space to reserve in the database. Also, offline reorganization (like some strategies for online reorganization) has a prerequisite period of quiescing of user' activities.

What is needed is a system that is capable of reorganizing a database online or incrementally with minimal offline periods. By eliminating or minimizing the amount of time offline, a user may retain the ability to read and/or write to the database during all or most phases of reorganization. In particular, what is needed is online reorganization for restoration of clustering and removal of overflows.

Moreover, what is needed is a system for online reorganization with the following properties. Records that do not require a unique identifier which does not change during reorganization. The ability for users to insert, update, and delete data during reorganization. Lack of need for a user transaction to hold its locks until commitment of a transaction. Reorganization that does not significantly degrade user' performance (e.g., by performing a large amount of locking). Reorganization that does not require permanent extra space in the area where user' data is stored. An internal processing by the reorganization that limits the amount of page input/output.

Applicants have identified the ability to reorganize databases using a combination of a log application with the use of a mapping table. No prior work exists that combines log application with the use of a mapping table.

DISCLOSURE OF INVENTION

Reorganization of a Database Management System (DBMS) is disclosed. Reorganization is implemented by recording a first current relative byte address (RBA), which is a position within a log. Then, data is copied from an old area in the table space to a new area in the table space, in reorganized form. The new area is a new version of the table space after reorganization.

In the present invention, throughout reorganization a user maintains access to the DBMS's normal facilities to read and write to the old area. The DBMS uses its normal facilities to record writing, which occurs during reorganization, in a log. The reorganization in accordance with the present invention reads the log (that has been written to during reorganization) and applies the log to the new area to bring the new area up to date. However, after reading the log but before applying the logged writing, the reorganization of the present invention sorts the log entries by record identifier (RID). This sorting improves the locality of reference (and thus the speed) of log application. It also eases the detection (and omission during application) of a sequence of logged operations that has no net effect (e.g., insert . . . update . . . delete). Finally, at the end of reorganization, the user's access is switched from the old area to the new area.

In particular, the log identifies a record by the data record's record identifier (RID). As an inherent part of reorganization, RIDs change. Accordingly, since the log entries correspond to user' writing of the old area, the log entries use the old RIDs. To apply a log entry to the new area, the record in the new area to which the entry should apply must be identified (i.e., the new RID). In the present invention, identification of the new record (by new RID) is done by maintaining a temporary table that maps between the old and new RIDs. The strategy uses this table to translate log entries before sorting them (by new RID) and applying them to the new area.

BRIEF DESCRIPTION OF DRAWINGS

The foregoing and other objects, features and advantages of the invention will be apparent from the following more detailed description of the invention, as illustrated in the accompanying drawings.

FIG. 2 shows exemplary file pages for a table of the present invention;

FIG. 3 shows exemplary index pages for a table of the present invention;

FIG. 4 shows an overview of the steps of online database reorganization system of the present invention;

FIG. 5 shows detailed steps of the online database reorganization system of the present invention;

FIG. 6 shows a mapping table of the present invention;

BEST MODE FOR CARRYING OUT THE INVENTION

An embodiment of the invention is now described with reference to the figure where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Reorganization of a database means changing some aspect of the logical and/or physical arrangement of the database. Any DBMS will need some type of reorganization.

One type of reorganization involves restoration of clustering and removal of overflows. Clustering is the policy of storing instances near each other if they meet certain criteria. One popular criterion is consecutive values of a key. Clustering should improve performance by reducing disk traffic for instances that a user often accesses in temporal proximity. Of course, a user's writing can fill data pages, decrease the amount of clustering, and degrade performance. Reorganization can restore performance.

Figure 1:
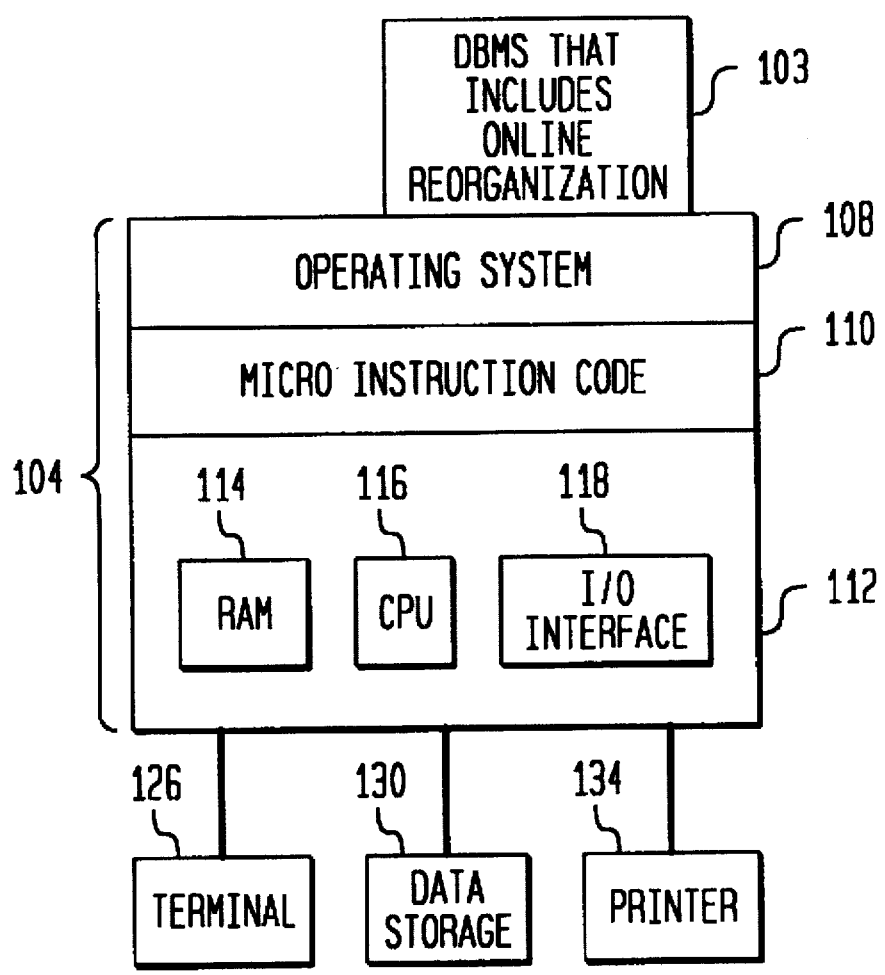
FIG. 1 shows an environment in which the present invention operates.

FIG. 1 illustrates an environment in which a preferred embodiment of the present invention operates. The preferred embodiment of the present invention operates on a computer platform 104. The computer platform 104 includes certain hardware units 112 including one or more central processing units (CPU) 116, a random access memory (RAM) 114, and an input/output (I/O) interface 118. The computer platform 104 includes an operating system 108, and may include microinstruction code 110. A database management system 103 (hereinafter DBMS 103), which may include online reorganization, uses operating system 108. Application programs can use DBMS 103 and operating system 108. Various peripheral components may be connected to the computer platform 104, such as a terminal 126, a data storage device 130, and a printing device 134.

DBMS 103, when executed, enables the computer platform 104 to perform the features of the present invention as discussed herein. Thus, DBMS 103 represents a controller of the computer platform 104.

DBMS 103 preferably represents a computer program or a library which resides (during run-time) in the main memory or RAM 114, and which is executed by the processors in the computer platform 104, such as CPU 116. The data maintained by DBMS 103 may be stored in, for example, data storage 130. Also, the computer program library associated with DBMS 103 may be stored in data storage 130, which may include, for example, a floppy disk or some other removable storage medium, which is read by the floppy drive or some other storage unit. The computer platform 104 may also be connected to a network. In this case, data may be retrieved from relational tables stored in storage devices in communication with computer platform 104 via the network.

The present invention may apply to a variety of storage structures where disorganization may arise and reorganization is needed. In particular, the present invention is discussed in the context of a set of storage structures for relational databases. Specifically, the storage structures used in IBMe®'s DATABASE 2200 , DB2®, and System R DBMSS are disclosed. (IBM, DATABASE 2, DB2 are trademarks of the International Business Machines Corp.) However, the present invention may also apply to other storage structures or data models.

In relational database management, data is stored in a two-dimensional data table, which may be stored in a table space. The relational DBMS may work with two data tables at the same time, relating the information or data through links established by a common column or field. In particular, the storage and retrieval of data occurs in the form of relational tables.

A table space of the present invention stores one or more tables. For purposes of this discussion, a single table will be referred to in a table space.

A table space contains file pages to store tables. FIGS. 2 and 3 show the structure of file pages and index pages, respectively. In DB2, index pages are stored separately from the table space discussed herein.

Each file page shown generally at 210 and 212, contains zero or more data records (shown generally as 216, 218 and 230), which DBMS 103 allocates at the beginning of each of the pages 210 and 212. There are three types of data records, regular (216), pointer (230) and overflow (218). The end of file pages 210 and 212 contain an ID map shown generally at 220 which is an array of pointers (offsets of data records within the file page). Slot refers to the space (if any) to which an ID map entry points. Specifically, in file page 210, an entry (shown as "*") in pointer 224 points to a slot for regular data record and is shown generally as arrow 240; and an entry in pointer 222 points to a slot for pointer data record 230, and is shown generally as arrow 238. In file page 212, an entry in pointer 244 points to a slot for regular data record 216, and is shown generally as arrow 228; and an entry in pointer 242 points to a slot for overflow data record 218, and is shown generally as arrow 226. The header of each page includes the position in the log, i.e., the relative byte address (RBA 214) that was current when file page 210 or 212 was most recently written. Whenever users insert (I), update (U) or delete (D), DBMS 103 records the activity in the log and thus increases the current RBA.

In DB2 and several other DBMSS that use Structured Query Language (SQL), not every table has a unique key (a set of columns that identifies records). Therefore, file pages, indexes, and entries in the log cannot use a key for identification. Instead, they use a record's record identifier (RID), which consists of the record's page number and the offset of the record's entry within the ID map. A record's RID can change only during reorganization. In DB2, file pages, indexes and entries in the log always use a RID for identification even if a table does have a unique key.

On insertion of a record, or on growth by update of a variable-length column of a preexisting record, if the file page lacks enough contiguous free space, DBMS 103 compacts the file page to make its free space contiguous. (Insertion, deletion and update are discussed below.) If compaction does not produce enough space, the data goes onto another page. On insertion, the new data's RID denotes that other page (not shown). On growth of existing data, the existing data's RID still denotes the original page 210, but the existing data record on the original page 210 becomes a pointer data record 230 (a record containing the RID of the new overflow data record 218 on file page 212, which contains the actual data). Data records that do not involve overflow are regular data records (216). The header of data records 216,218 and 236 contain bits (i.e., 0 or 1) to indicate whether the record is, for example, a pointer or an overflow.

Referring now to FIG. 3, an index is shown generally at 300. Index 300 contains a hierarchy of index pages 310,312 and 14. There are two kinds of index pages: leaf pages and nonleaf pages. Every index contains both kinds of pages. The leaves are the bottom of the hierarchy and everything else is nonleaf. As shown, index leaf pages are shown generally at 312 and 314, and a nonleaf page is shown generally at 310. Each entry on leaf pages 312 and 314 contains a key value and a list of RIDs whose records have that key value; DBMS 103 can sort the list by RID. For each table, the database designer declares at most one index as a clustering index. In offline reorganization (and, whenever possible, in subsequent insertions), the assignment of data records to file pages reflects the data record' logical order in the clustering index. This clustering speeds some queries. The database designer can declare the clustering index to be a partitioning index; i.e., DBMS 103 divides the table into partitions (an optional subdivision of a table) according to values of the indexed key.

Data can become disorganized when free space becomes unevenly distributed among the areas of a table space. After subsequent insertions, the order of data instances no longer reflects the clustering index. This slows some queries. In addition, data can become disorganized when variable-length data grows too large to fit on its original page, and DBMS 103 moves the excess data to a new page and makes the original record a pointer data record. Indexes still point to the original record. This causes an extra page reference on some queries.

In the present invention, reorganization of the database is performed while a user maintains the use of the DBMS's normal facilities to read and write to the old area (pre-reorganization) of the table space, and DBMS 103 uses its normal facilities to record the writing in the log.

FIG. 4 shows an overview of the steps of the present invention. The table space and the associated indexes are reorganized at step 402. Then the reorganized data is updated at step 404 by processing the log using a RID mapping table. Finally, a user's access is switched to the area containing the reorganized data at step 406. Step 402, 404 and 406 are discussed in detail below.

As discussed above, an entry in the log identifies a data record by the data record's RID. The present invention relates to the type of reorganization where the RIDs change during reorganization. In such reorganization, the log entries correspond to the user's writing to the old area and thus use the old RIDs. To apply a log entry to the new area, the record in the new area to which the log entry should be applied must be identified. In the present invention, the data record in the new area is identified by maintaining a temporary table that maps between the old and new RIDs. After this the table is used to translate the old RID to the new RID. Then the log entries are sorted and applied to the new area.

The interaction between processing of the log and maintenance of the mapping table of the present invention will now be discussed. In particular, the mapping table is updated (for each log entry) to reflect (1) a state (e.g., regular, overflow or pointer as discussed below) of the data record before processing of the log entry and (2) the type of log entry. The types of log entries may include insertions, deletions and updates. For a log entry that represents an insertion, this updating includes the use of an estimated new RID (as a basis for sorting) and eventual translation of estimated new RIDs to actual new RIDs. Estimated RIDs are discussed in greater detail below.

Referring now to FIG. 5, the steps of reorganization of the present invention are shown. The reorganization can apply to a partition of a table space or to an entire table space.

At step 502, the first current RBA for the log is recorded and stored as a variable called BEGIN—RECENT. The variable is part of the reorganizer's storage area. Users have read/write access to the old area during this step 502.

Next, at step 504, a reorganization (unload, sort, and reload) is performed by the reorganizer directing the reorganized version of the data record into a new area. During step 504, a user retains read/write access to the old area. The reorganizer maintains a temporary mapping table (discussed in greater detail below and shown in FIG. 6) that maps between the old and new RIDs for the data records. When the reorganizer unloads a record's data from the old area, it also "unloads" the old RID, not just the record's data. When reorganizer reloads into the new area, it reloads just the record's data, not a RID, but it also inserts an entry containing the old RID and the new RID into the mapping table. Reloading also involves reconstructing indexes. If the entire table space is reorganized, all the indexes are reconstructed, that is, new copies of all the indexes are created. If a partition of the table space is reorganized, a partition of the clustering index is reconstructed, and a copy of a subset of each nonclustering index is created; the subset corresponds to the data records in the partition being reorganized. At the end of step 504, a second current RBA is recorded as a variable called END—RECENT.

Next, at step 506, a subset of the log is read. This subset consists of the entries from BEGIN—RECENT through END—RECENT—1. The log entries (for data) are applied to the new area of the table space or partition. This log processing will reflect user' writing that occurred during the previous step 504 or the previous iteration of this step 506. A log entry contains (among other things) an RBA, an old RID, and an operation, such as insertion or deletion. Log processing uses the temporary table that maps old and new RIDs. The log processing step 506 affects the indexes by modifying indexes to reflect the modifications to the data. For example, if a record is inserted in a table, and the table has indexes, then the indexes are modified to include the RID of the newly inserted index.

During step 506, a user has read/write access to the old area of the table space. At the end of an iteration of step 606 a comparison is made. In particular, (current RBA—END—RECENT), which is the amount that the next iteration would process, is compared to (END—RECENT-BEGIN—RECENT), which is the amount that this iteration processed. If the next iteration would process at least as much as the present one processed, then the reorganizer's reading of the log is not catching up to user' writing of the log. Accordingly, an action is taken to solve this problem. A parameter of the reorganization command determines the action that should be implemented to allow the reorganizer's reading of the log to catch up to the user's writing of the log. The possible actions are quiescing writers of the table space or partition, increasing the scheduling priority of reorganization, aborting reorganization, and asking the operator to choose one of the above actions. If the reorganization is not aborted, BEGIN—RECENT is set to END—RECENT; and END—RECENT is set to the second current RBA. Then, if END RECENT-BEGIN RECENT exceeds a size (another parameter), and the number of iterations so far is less than a limit (another parameter), then another iteration of log processing step 506 is begun. Otherwise, the next step 508 is proceeded to. The purpose of comparing the above with the size and limit parameters is to limit the number of iterations of step 506.

At step 508, writing to the table space or partition is quiesced, if the previous step 506 did not already quiesce this writing. Then, END—RECENT is set to the third current RBA for the log. A user may continue to have read-only access to the old area during step 508.

At step 510, the log is processed again, from BEGIN—RECENT through END—RECENT—1. This last step of processing of the log is necessary only to handle writing that was in progress when (or that began after) the previous step 506 of processing of the log finished reading the log. A user has read-only access to the old area during step 510.

At step 512, all access of the table space or partition is quiesced.

At step 514, a renaming (i.e., change the mapping from logical to physical) is performed so that all future access to the table space will use the new area. Similarly, renaming is performed so that all future access of the indexes or index partition, which were reconstructed as discussed above, will use the reconstructed versions. If only a partition is being reorganized, RIDs are corrected for this partition in any nonclustering indexes (in place, not by copying) as follows. In particular, for each nonclustering index, for each key value, the old RIDs for this partition are replaced by the new RIDs (in the constructed subset of the index discussed above in step 504). For each key value, the old RIDs for this partition are contiguous only if the index's definition specified that the RIDs in the leaves will be sorted (and thus grouped by partition). The correction of RIDs for a sorted index is faster than for an unsorted index. With one exception, a user has no access to the old area during step 512. The exception is that during the correction of nonclustering indexes (for reorganizing a partition), queries that read just the index key values but not the RIDs can be allowed.

At step 516, a backup copy of the new table space or partition (as a basis for future recoverability) is created. Read/write access to the new area of the table space or partition is started. Possible sequences for this step 614 include: (1) start read-only access, create a backup copy while allowing read-only access, and then start read/write access (after the backup copying completes); or (2) start the creation of a backup copy via a facility that allows concurrent writing, and start read/write access as soon as the backup copying begins (instead of waiting for the backup copying to complete); or (3) create a backup copy during reorganization step 504, append translated log entries to the original log in steps 506 and 510, and start read/write access immediately in step 516.

At step 518, the old area, the old versions of reconstructed indexes, the copies of subsets of nonclustering indexes, and the mapping table are erased.

In accordance with the present invention, reading and writing during almost all activities in the reorganization, including the log processing step 506, are possible. Subsequent steps involve a period of read-only access (steps 508 and 510) and a period of no access (steps 512 and 514). The relatively short steps of read-only access (steps 508 and 510) or no access (steps 512 and 514) occur after processing of most of the logged writing.

To reorganize just a partition, step 514, discussed above, brings the partition completely offline during an expensive operation of changing entries in nonclustering indexes. As an alternative for changing entries in nonclustering indexes, in step 504, a copy of all (not only a subset) of each nonclustering index is constructed; in step 506 and 510, for each nonclustering index, the translated log entries are applied to the entries in those indexes for this partition (as discussed above), and also the untranslated log entries are applied to the entries in those indexes for the other partitions; and in step 514, all access to those indexes (even for the other partitions) is quiesced, and the indexes are replaced by the new copies of the indexes.

The advantage of this alternative is that it greatly shortens the amount of time in step 514, when this partition is offline. However, although the amount of time is shortened, this alternative requires briefly quiescing of all access to all the nonclustering indexes (even for the other partitions).

Structure of the Mapping Table

Referring now to FIG. 6, the mapping table is shown generally at 610. Mapping table 610 may be a database table or a special structure. Mapping table 610 includes columns and rows. The columns include, from left to right, TYPE, SOURCE—RID, TARGET—RID, and RBA. The TYPE column actually contains numbers (or single characters), but table 610 uses symbols for illustrative purposes. The first character of the symbol relates to the old RID record. In particular, character C means that the old RID's record contains columns of data, and P means that the old RID's record is a pointer. The second character (if any) of the symbol also relates to the RID and has the following possible values and meanings. The character R means that the TARGE—RID is the actual RID of a new regular data record or pointer data record. The character E means that TARGET—RID is the estimated RID of a new record that will be inserted later when the log is applied. The determination of the estimated RID will be discussed in detail below.

For all values of TYPE, the RBA initially contains the RBA of the old page that contained the old RID, as of the time when the reorganization step 504 unloads the file page. Thereafter, processing of a log entry will result in updating of the RBA column in the mapping table's entry for the record to which the log entry applies.

In mapping table 610, the SOURCE—RID has a unique index. This index does not need uniqueness, since the old RIDs are unique. However, a unique index is smaller and may be beneficial in a query optimization. The TARGET—ID has a nonunique index for the reasons discussed below.

In an alternative implementation of the mapping table, the column for SOURCE—RID may be eliminated. In such case, there will be an entry for each possible source RID (i.e., each possible combination of page number and record number within the page). Based on the table space's number of pages, the page size and the record size (or minimum record size for a variable-length table), the number of entries may be calculated. This alternative implementation advantageously uses less space for each mapping table entry and eliminates the need for an index on SOURCE—RID (instead, a calculated offset from the start of the mapping table is looked at), which eliminates the space needed for the index and the time needed for accessing the index. Nonetheless, with this alternative implementation, each possible source RID (even one whose slot is empty) still requires space in the mapping table for an entry; if the file grows due to extension, the mapping table must grow similarly; and for each possible source RID a mechanism is required to determine whether an entry logically exists. One way to determine whether an entry logically exists is to use a value of "N" in the TYPE column, but this requires initialization.

Behavior of a RID and its Slot

For each type of writing by a user (i.e., a high-level operation of insertion, update or deletion), DBMS 103 performs one, two or three low-level operations, and DBMS writes corresponding log entries as follows.

Insertion (I):
One insertion of a regular record.

Update (U):
If there was no overflow and still is no overflow: one update occurs from a regular data record to a regular data record.

If there was no overflow, but now there is overflow: then one update occurs from a regular data record to pointer data record and one insertion of an overflow record occurs.

If there was an overflow, and the new data fits on the overflow's page: then one update occurs from overflow data record to overflow data record.

If there was an overflow, and the new data is too large for the overflow's page:

if there is now room on the pointer's page: then one update occurs from pointer data record to regular data record, and one deletion of an overflow record occurs; or if there is still no room on the pointer's page: then one update occurs from pointer data record to pointer data record, one deletion of an overflow record occurs, and one insertion of an overflow record occurs.

Deletion (D):

If there is no overflow: then one deletion of a regular data record occurs.

If there is overflow: then two deletions occur, one deletion of a pointer data record and one deletion of an overflow data record.

During a back out of a transaction (i.e., cancellation of the effects of changes made by a transaction), DBMS 103 performs operations (i.e. I, U, D) and writes corresponding compensation log entries to reverse the original operations. A compensation log entry represents the operations that DBMS 103 performs in a backout. For example, to back out a deletion when there was overflow, two insertions are used, in particular, a pointer data record and an overflow data record.

Figure 7:
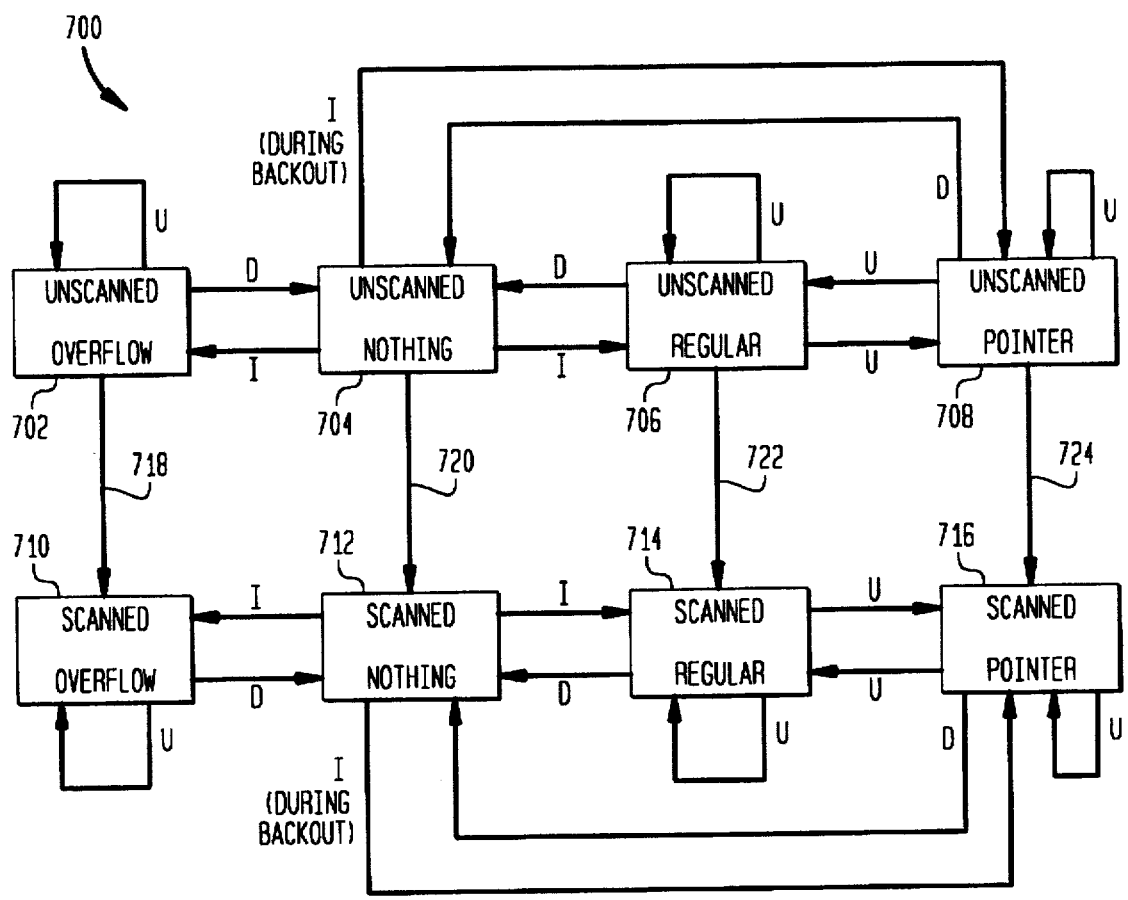
FIG. 7 shows a state transition diagram for a RID during user' writing and the reorganizer's unloading.

Referring now to FIG. 7 a state transition diagram is shown generally at 700. Diagram 700 represents a state transition for a RID during writing by users (discussed above) and unloading by the reorganizer (discussed below) during reorganization step 504. The states indicate whether reorganizer has scanned the RID yet during the unloading part of reorganization step 504; and what the RID's slot contains (an overflow data record, nothing, a regular data record, or a pointer data record).

Four states, 702, 704, 706 and 708, include the four possible initial states (before the unloading begins). States 702, 704, 706 and 708 are all unscanned states. Specifically, state 702 is unscanned overflow data record, state 704 is unscanned nothing (discussed below), state 706 is unscanned regular data record and state 708 is unscanned pointer data record. Four states 710, 712, 714 and 716 include the four possible final states (after the unloading finishes). States 710, 712, 714 and 716 are all scanned states. Specifically, state 710 is scanned overflow data record, state 712 is scanned nothing, state 714 is scanned regular data record and 716 is scanned pointer data record. The transitions between states 702, 704, 706, 708, and the transitions among states 710, 712, 714 and 716, are shown generally as I, D and U. The transitions represent Insertion (I), Deletion (D), Update (U). The transitions shown generally as 718, 720, 722, and 724, represent the reorganizer's scan of that RID data (during unloading part of the reorganization step 504) by scanning the table space sequentially and unloading the data records. For each RID in the table space, the RID is a state. During the scan for transition 718, the overflow data record is scanned and the overflow data record is unloaded. Later, during reloading of the overflow data record, a CR entry is inserted into mapping table 610. During the scan for transition 720, nothing is scanned and nothing is done. During the scan for transition 722, the regular data record is scanned and the scanned regular data is unloaded (step 506). Later during reloading, a CR entry is inserted in mapping table 610. During the scan for transitional 724, the pointer data record is scanned. Then, a P entry is inserted into mapping table 610.

Unloading and Reloading within the Reorganization Step

The reorganizer unloads data by scanning the table space sequentially and unloading data records. The reorganizer then sorts the data by using the clustering key. Unloading is performed as discussed briefly above. In particular, when a regular data record or an overflow data record (in the old area) is scanned; the data, the old RID and the RBA of the regular data record's old page or overflow data record's old page are unloaded. When a pointer record is scanned, as briefly discussed above, a P entry (including values for all the appropriate columns) is added to mapping table 610 and the pointer is not followed. Unloading an overflow data record at the same time the overflow data record's page is scanned, is more efficient than unloading the overflow data record when the pointer data record's page is scanned.

When a regular or overflow data record is reloaded (in the new area), a CR entry is added to mapping table 610, using the old RID and RBA from the unloaded old regular or overflow data record in the unload file and the new RID from the new area. Even if the old data record overflowed in the old area, the new data record will not overflow in the new area. Only the later processing of an update found in the log may cause an overflow in the new area. The order of adding CR entries to the mapping table is the order of new RIDs.

Instead of scanning the table space, an alternative is to scan the most recent backup copy of the table space. This alternative eliminates the need of reorganizer to access and lock the table space. However, this alternative requires the reorganizer to process additional log entries, in particular, all the entries since the backup copy was made.

The later processing of log entries will include access to the mapping table by old RID. To make this access more efficient (largely sequential instead of random), the log entries will be sorted by old RID before accessing the mapping table. Although user' writing has reduced the degree of clustering of the table space, there will be a correlation between the order of the record' (and thus mapping table entries') old RIDs and the order of their new RIDs. Therefore, the order of the log entries (sorted by old RID) should approximate or match the order of the mapping table entries (added by new RID, as described above, or sorted by old RID, as described below). Therefore, access to the mapping table will be approximately sequential.

As CR entries are added to the mapping table, the average difference between the old and new RIDs is calculated. This average indicates the degree of clustering of the old area and thus the correlation between the order of the old RIDs and the order of the new RIDs. If the average exceeds a threshold, and the number of log entries since reorganization was begun exceeds a threshold, then the mapping table is sorted by old RID at the end of this step, to speed the later access to the mapping table during processing of the log. The comparisons to the thresholds determine whether this sorting is worthwhile.

Processing the Log

Steps 506 and 510 in the reorganization of the present invention process the log. Log application has more locality of reference and thus is faster if the log entries are sorted by RID before applying them. The sorting also eases the detection (and omission during application) of a sequence of logged operations that has no net effect (e.g., insert . . . update . . . delete). This omission covers log entries which no longer have the appropriate entries in the mapping table. The sorting should use the new RID. As discussed earlier, sorting the log entries by old RID should speed the access to the mapping table for translation from old to new RIDs.

In the present invention, processing of the log has the following phases:

1. Sorting by old RID: Sort pointers to the log entries by old RID.

2. Translation: Copy the subset of the log that applies to the area being reorganized and whose RBA's are from BEGIN—RECENT to END—RECENT—1 and translate the RID of each log entry from old to new.

3. Sorting by new RID: Sort pointers to the translated log entries by new RID. This phase may be combined with the previous phase.

4. Application: Apply the translated, sorted log entries to the new data area.

For an insertion, the new RID is not known until the insertion is actually performed, which will occur after the sorting by new RID. Therefore, the translation phase (which occurs before the sorting by new RID) calculates an estimated new RID for the inserted record, based on the page numbers for records that have similar values for the clustering key and that already exist in the new area. It is efficient but not logically necessary for the estimated new RID to be close to the eventual actual new RID.

Figure 8:
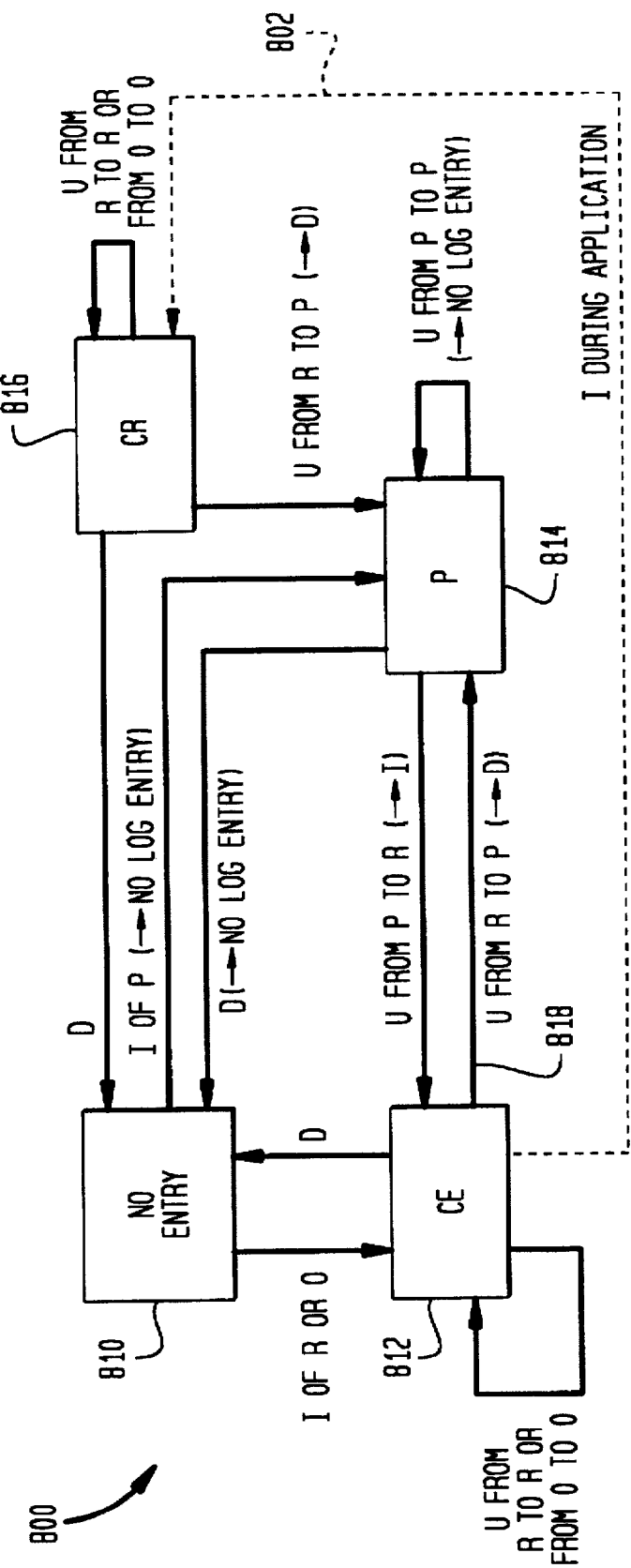
FIG. 8 shows a state transition diagram for an old RID's mapping table entry during processing of the log.

Referring now to FIG. 8, a state transition diagram for an old RID's mapping table entry (if any) during log processing is shown generally at 800. Each state represents a type of entry (or no entry) in the mapping table 610. Diagram 800 includes state 810 as a "no entry" state, state 812 as a CE state (CE is discussed above), state 814 as a P state (p is discussed above) and state 816 as a CR state (CR is discussed above). The dashed transition 802 represents the processing of an insertion log entry during the phase for application. The transitions shown by solid lines represent the processing of applicable log entries during the phase for translation. Each solid line transition is labeled with the type of log entry (I, D, or U). For an insertion, the type of old record (R for regular, P for pointer, or O for overflow) is shown. For an update, the type of old record is also shown before and after the update. If the translation changes the type of log entry, the changed type of log entry appears after an arrow, both of which are shown in parentheses. For example, a transition 818 represents a log entry that updates (U) the old data record from a regular data record (R) to a pointer data record (P) when the old RID has a CE entry in the mapping table 610. In this transition, the log entry is changed from update to deletion (D), and the mapping table entry is changed from CE to P. The sections below explain how to apply the log; the explanations cover all the transitions in the diagram.

1. Phase for Sorting by Old RID

Construct pointers to the log entries and sort the pointers by old RIDs of the log entries. This sorting speeds the later accessing of the mapping table. The set of pointers could be arranged as an index; this is an implementation decision.

2. Phase for Translation

Scan the set of pointers to log entries, which is now sorted by old RID. This phase will modify RIDs in log entries. Reorganization must not modify the original log, since possible later recovery to a point in time might need the original log. Therefore, the relevant part of the log is copied as part of the translation phase, and the RIDs in the copy will be modified. As discussed hereinafter, most references to the log actually refer to the copy of the log.

A DBMS's log application (as part of recovery) ignores a log entry if its RBA is less than or equal to the RBA of the page to which the log entry refers. This behavior handles log entries that are inapplicable to what has been unloaded. Such a situation can occur if writing and the associated log entry occur after unloading begins but before the unloading reaches the record. The sequence of events may be as follows:

1. A RID's slot is empty when unloading begins.

2. A user inserts a record there, and DBMS 103 appends an insertion entry for that RID into the log.

3. The unloading reaches that slot and reads the inserted record.

4. During log application, the log entry is found. Applying the log entry for insertion would not make sense, since the unloading has already read the inserted record. Therefore, this log entry is ignored.

Similarly, the translation phase refrains from copying (effectively ignores) an inapplicable log entry.

The next three sections describe how to translate insertion, update, and deletion entries found in the log.

Translation of an Insertion Entry Found in the Log

If the old RID has an entry in the mapping table, copying of the log entry is refrained from (the log entry is effectively ignored). Otherwise, if the insertion represents a regular or overflow record then calculate an estimated new RID. For unique identification during the later phase of application, this new RID must differ from all estimated or actual new RIDS now in the mapping table. Therefore, an index on TARGET RID is needed. ACE entry is inserted into the mapping table, using the old RID found in the log, the estimated new RID, and the RBA of the log entry. In the log entry, the RID is translated to the estimated new RID.

If the insertion represents a pointer record (which occurs only in a backup), then a P entry is inserted into the mapping table 610, using the old RID found in the log and the RBA of the log entry. Copying of the log entry is, again, refrained from. This behavior resembles the scanning of a pointer record during unloading.

Translation of an Update Entry Found in the Log

If the old RID does not have an entry in the mapping table 610, or the RBA in the log entry is less than or equal to the RBA in the mapping table 610, then copying the log entry is refrained from. Otherwise, if the log entry is an update from regular data record to regular data record or from overflow data record to overflow data record, then proceed as follows. If the old RID has a CR or CE entry in the mapping table 610 then, in the log entry, the RID is translated to the contents of TARGET—RID. In the mapping table 610, the RBA is changed to the log entry's RBA. If the old RID has a P entry in the mapping table then copying of the log entry is refrained from.

If the log entry is an update from pointer to pointer, then proceed as follows. If the old RID has a CR or CE entry in the mapping table 610 then refrain from copying the log entry. If the old RID has a P entry in mapping table 610 then change RBA to the log entry's RBA in the mapping table 610. Copying of the log entry is refrained from.

If the log entry is an update from regular to pointer, then proceed as follows. If the old RID has a CR or CE entry in mapping table 610 then the RID is translated to the contents of TARGET—RID in the log entry, and the type of log entry is changed from update to deletion. In mapping table 610, RBA is changed to the log entry's RBA, and TYPE is changed to P. This is done because the data (for this slot) has already been found in the old area or in the log. However, this slot (in the old area) has become a pointer. Therefore, the already found data is already known. Thus, a deletion entry is generated in the log. The real data, from the corresponding overflow in the old area, is retrieved when the RID is processed for the overflow in the old area. Since the new copy of the data corresponds to old regular records and old overflow records but not to old pointer records; an update from regular to pointer is treated similarly to a deletion. If the old RID has a P entry in the mapping table 610 then copying of the log entry is refrained from.

If the log entry is an update from pointer to regular data record then proceed as follows. If the old RID has a CR or CE entry in the mapping table 610 then refrain from copying the log entry. If the old RID has a P entry in the mapping table 610, then as in an insertion, an estimated new RID is calculated. In the log entry, the RID is translated to the estimated new RID, and the type of log entry is changed from update to insertion. In the mapping table 610, TYPE is changed to CE, RBA is changed to the log entry's RBA, and TARGET—RID is changed to the estimated new RID. Since the new copy of the data corresponds to old regular records and old overflow records but not old pointer records, an update from pointer to regular data record is treated similarly to an insertion.

Translation of a Deletion Entry Found in the Log

If the old RID has no entry in the mapping table 610, or the RBA in the log entry is less than or equal to the RBA in the mapping table 610, refrain from copying the log entry. Otherwise, proceed as follows. If the old RID appears in a CR or CE entry in the mapping table 610, then translate the RID in the log entry to the contents of TARGET—RID, and delete the entry from the mapping table 610. If the old RID appears in a P entry in the mapping table 610, then refrain from copying the log entry, and delete the entry from the mapping table 610. The reason for this is that the log contains another entry to delete the corresponding old overflow, and eventually that other log entry, not this log entry, will be translated to delete the actual data.

Alternatives for Checking Log Entries

In the description so far, the translation phase of log processing compares the RBA of the log entry to the RBA in the mapping table's entry for the record to which the log entry applies. This phase also checks the mapping table for appropriateness of operations; e.g., updating a nonexistent record is inappropriate. These two checks are probably redundant in most DBMSs, so the implementor can choose among the following implementations: (1) compare the RBAs, and also check for appropriateness of operations; either type of checking can result in ignoring a log entry (as discussed above); (2) compare the RBAs, and also check for appropriateness of operations; the RBA comparison can result in ignoring a log entry; the appropriateness checking can result in abnormal termination of reorganization; any log entry with a good RBA should not contain an inappropriate operation; or (3) omit the RBAS from the mapping table 610, thus saving space and omitting the RBA comparison; the appropriateness checking can result in ignoring a log entry.

3. Phase for Sorting by New RID

Sort pointers to the translated log entries, using a major sort on RID and a minor sort on RBA. The major sort speeds the later actual processing of the log. The minor sort preserves the logical order of events. The set of pointers may be arranged as an index.

4. Phase for Application

Scan the set of pointers to log entries, which is now sorted by new RID. Log application is performed for each RID value in the log. These are new RID values (including estimated new RID values for inserted records). This is why an estimated new RID must differ from other estimated new RIDs and from real new RIDs that were already in the mapping table 610 when the new RID was estimated.

For each RID value in the log, the following is done.

1. Find all the log entries for that RID. They will be contiguous.

2. If there is at least one D log entry for that RID, perform these deletions of log entries:

if the first log entry is I (i.e., the slot is initially empty), delete the last D log entry and all the preceding log entries;

if the first log entry is D or U (i.e., the slot is initially occupied), keep the last D log entry, but delete all the preceding log entries.

These deletions omit log entries which no longer have the appropriate entries in the mapping table 610. These deletions also omit log entries whose effects would be nullified by a later D log entry. For example, the sequence I U U D has no net effect, so there is no need to waste the time to apply it.

3. If the preceding deletions deleted all the log entries for the RID, application for this RID is finished. If there are still log entries, apply them sequentially, as described below.

The next three sections describe how to apply insertion, update, and deletion entries found in the log.

Application of an Insertion Entry Found in the Log

The following is done in the processing of an insertion entry found in the log. Insert the record in the new area, and obtain its actual new RID. In the mapping table, find the CE entry whose TARGET—RID (estimated new RID) matches the log entry's estimated new RID. This is another reason why the index on TARGET—RID is unnecessary. In that entry in the mapping table, change the TYPE from CE to CR, and change the TARGET—RID from its estimated value to the actual value. In all the log entries for the current RID, change the RID from the estimated value to the actual value.

It is possible that the actual new RID will equal the estimated new RID of this record or of a different record. This is why the index on TARGET—RID is not unique.

For each new RID value in the log, log application is performed for all the log entries for that RID before the log application is performed for any other new RID value in the log. This is why it is not a problem if the actual new RID for an inserted record equals the estimated new RID for any inserted record.

Application of an Update Entry Found in the Log

The RID in the log entry identifies a regular record or a pointer record. The behavior of log application (in the new area) resembles the behavior of the DBMS's processing of a user's update. If there was no overflow and still is no overflow, update the regular record. If there was no overflow, but now there is overflow, update the regular record to become a pointer, and insert an overflow record. If there was an overflow, and the new data fits on the overflow's page, update the overflow record. If there was an overflow, and the new data is too large for the overflow's page then: (1) if there is now room on the pointer's page, update the pointer record to become a regular record, and delete the overflow record; if there is still not room on the pointer's page, update the pointer record, delete the overflow record, and insert an overflow record.

Application of a Deletion Entry Found in the Log

The RID in the log entry identifies a regular record or a pointer record. The behavior of log application (in the new area) resembles the behavior of the DBMS's processing of a user's deletion. If there is no overflow, delete the regular record. If there is overflow, delete the pointer record and the overflow record.

Type Of Scanning

The reorganizer scans the table space and then sorts by clustering key, instead of scanning the clustering index (which is already sorted). This decision has a correctness reason and a performance reason:

Correctness reason: In a scan of the clustering index, consider this sequence of events:

1. Initially, RID 3 contains a record whose clustering key value is Jones.

2. The reorganizer reaches the "J" portion of the clustering index, and it copies the Jones record from RID 3 in the old area to RID 17 in the new. Now in the new area, RID 17 contains Jones.

3. A user updates the record, changing Jones to Smith. The log will record this as an update of RID 3 from Jones to Smith. Alternatively, users might delete Jones and insert Smith, and DBMS 103 might use the former RID of Jones for Smith.

4. The reorganizer reaches the "S" portion of the clustering index, and it copies the Smith record from RID 3 in the old area to RID 90 in the new. Now in the new area, RID 17 contains Jones, and RID 90 contains Smith. The mapping table 610 may now have two entries for old RID 3.

5. At the end of loading, the log is applied to the new area. Specifically, it is found that RID 3 was changed from Jones to Smith, and RID 17 in the new area is changed from Jones to Smith. Now in the new area, two RIDs (17 and 90) contain Smith. This is incorrect; there should be only one record for Smith. Some special handling would be necessary to prevent this error. The record for Jones in the new area is deleted (not updated).

Performance reason: Reorganization would probably only be performed if a table space has become unclustered. Studies have found that for offline reorganization of an unclustered table space, a table space scan and a sort together are usually faster than a scan of the clustering index, since an index scan for an unclustered table space involves many jumps between data pages.

Temporary Violation of Unique Indexes

During reorganization and log processing, a temporary violation of unique indexes might occur. Here is an example:

1. An early page of the table space contains a record whose unique key value is Jones.

2. The reorganizer unloads the record for Jones.

3. A user deletes Jones, and a user then inserts Jones in a later page of the table space.

4. The reorganizer unloads the second record for Jones.

5. The reorganizer reloads both records for Jones, thus temporarily causing a uniqueness violation.

6. The reorganizer eventually processes the log and deletes the first record for Jones, thus removing the uniqueness violation.

In the old area, the unique indexes enforce uniqueness. The set of values in the new area will eventually equal the set of values in the old area. Therefore, any such uniqueness violation is temporary.

In DB2, a nonunique index but not a unique index contains a field (for each key value) for a count of RIDs that have the key value. Therefore, this problem could not be solved by temporarily marking the unique indexes in the new area as nonunique.

Accordingly a solution is to always insert the data into the new table space. Try to insert entries into the unique indexes. If an insertion would violate uniqueness, instead save the RID in a special list. The list is probably short, since violation is probably rare. At the end of inserting data, again try to insert index entries for the saved RIDS.

Application of the log can cause modification of the special list. The last attempt to insert in the indexes, which occurs at the end of the last step of log processing, will always succeed, since the uniqueness violation is temporary.

Omission of a Mapping Table if a Key is Unique

If the table that is being reorganized has a unique key, a complete mapping table is not needed. Here DBMS 103 must include the value of that key in each log entry, even for operations that do not involve that key (e.g., update of a different column). This will let reorganization use the unique key (instead of old RIDs) to identify log entries and apply them to new records.

The main features of the step that unloads, sorts by clustering key, and reloads are as follows.

(1) Unload regular and overflow records (and their old RIDs) by scanning the table space. (2) Sort, using a major sort by the unique key and minor sort by the old RID. When several records have the same value for the unique key, keep the one with the highest RID (i.e., the most recent one) and discard the others. The unique key will be used to identify the data records to which the log entries should apply. This sorting and discarding assure that the unique key really is unique. (3) If the clustering key is not the unique key, then sort by the clustering key, not the unique key. (4) Reload data into the new area, and build the indexes.

Processing of the log consists of the following phases

1. Omit the phase for sorting by old RID.

2. Copy the relevant part of the log, and construct a set of pointers to the log entries. This phase includes the following features:

If the last one or two log entries (low-level operations) and the first one or two entries in the next part of the log (which is not seen in this iteration of log processing) could represent parts of the same high-level user operation, defer those last one or two log entries to the next iteration. Specifically, these pairs or triples of log entries could represent the same user operation: (D pointer, D overflow), (I overflow, D overflow, U pointer to pointer), (D overflow, U pointer to regular), (I overflow, U regular to pointer), and (I pointer, I overflow). This deferral assures that the unique key stays unique.

Translate an update of the unique key into a deletion (whose key is the old value) and an insertion (whose key is the new value). This translation simplifies the processing of the log.

3. Sort the pointers by clustering key or new RID. Specifically:

If the clustering key is the unique key, use a major sort by clustering key and a minor sort by RBA. The resulting order approximates but does not perfectly match the RID order. A mapping table is not needed.

If the clustering key is not the unique key, sort by the unique key (to speed access to the unique index). Then use a major sort by the new RID (which is obtained from the unique index) and a minor sort by RBA. For an insertion, estimate a new RID (which must differ from all existing actual or estimated RIDs) and store it in a mapping table (which reflects only inserted records) or in a fake entry in the unique index. For a deletion of such an inserted record, delete the temporary table entry or fake index entry. Insertions could not be applied immediately while deferring updates and deletions, since a sequence like I U D I might occur for a value of the unique key.

The RBAs are unique (except for an update of the unique key, which were translated into a deletion and an insertion, which apply to different key values).

4. In the list of pointers, for each clustering key value (if the clustering key is unique) or each new RID (if the clustering key is not unique), do the following:

If there is at least one deletion log entry, discard all the log entries before the last deletion.

Apply the remaining log entries. Specifically, for a deletion or update, if the record exists, apply the log entry. If the record does not exist, discard the log entry. For an insertion, if the record exists, discard the log entry. If the record does not exist, apply the log entry. Also, for an insertion, if the clustering key is not the unique key, delete the temporary table entry or fake index entry.

In one embodiment, the present invention is a computer program product (such as a floppy disk, compact disk, etc.)

comprising a computer readable media having control logic recorded thereon. The control logic, when loaded into RAM 114 and executed by the CPU 116, enables the CPU to perform the operations described above. Accordingly, such control logic represents a controller, since it controls the CPU during execution.

While the invention has been particularly shown and described with reference to preferred embodiments thereof, it will be understood by those skilled in the art that (various changes) (the foregoing and other changes) in form and details may be made therein without departing from the spirit and scope of the invention.

Having thus described our invention, what we claim as new and desire to secure by Letters Patent is:

1. A program storage device readable by a machine, tangibly embodying a program of instructions executable by the machine to perform method steps for performing reorganization in a database management system (DBMS), said method steps comprising:

reorganizing a data record in an old area of a table space, wherein said data record has an old record identifier (RID), while read/write access to said old area is retained;

directing said reorganized version of said data record to a new area in said table space, wherein said reorganized version of said data record has a new RID, while read/write access to said old area is retained;

maintaining a mapping table that maps between said old RID and said new RID;

copying a subset of a log;

translating a log entry RID for a log entry to said new RID, wherein said log entry RID is said old RID; and applying said translated log entry with said new RID to said reorganized version of said data record in said new area in said table space.

2. The program storage device according to claim 1, wherein said steps of reorganizing and directing comprise the steps of:

unloading said data record from said old area;

reorganizing said data record;

reloading said reorganized version of said data record, except said old RID, in said new area; and inserting an entry containing said old RID and said new RID into said mapping table during said reloading step.

3. The program storage device according to claim 1, wherein when said log entry comprises a plurality of log entries, and said method further comprises the steps of:

sorting said log entries by said old RIDs, prior to said step of translating; and sorting said log entries by said new RIDs, after said step of translating and prior to said step of applying.

4. The program storage device according to claim 1, wherein said step of translating comprises the step of:

calculating an estimated new RID.

5. The program storage device according to claim 1, wherein said step of maintaining a mapping table comprises the steps of:

updating said mapping table for each said log entry to reflect a state of said reorganized version of said data record, prior to said step of applying said log entry; and updating said mapping table for each said log entry to reflect a type of said log entry.

6. The program storage device according to claim 1, wherein said step of applying said log entry comprises:

updating a relative byte address (RBA) column in said mapping table for said reorganized version of said data record.

7. A program storage device readable by a machine, tangibly embodying a program of instructions executable by the machine to perform method steps for reorganizing a database, said method steps comprising:

recording a first current relative byte address (RBA) for a log as a first variable, while read/write access to an old area of a table space is retained;

performing reorganization of a data record with an old record identifier (RID) in said old area of said table space such that a reorganized version of said data record has a new RID in a new area of said table space, while read/write access to said old area is retained;

storing a second current RBA for said log as a second variable;

reading said first variable;

reading said second variable;

applying a first log entry including a log entry RID, wherein said log entry RID is said old RID, to said reorganized version of said data record identified by said new RID in said new area by using a RID mapping table to translate said old RID to said new RID, while read\write access to said old area is retained;

recording a third current RBA for said log as a third variable;

comparing a next iteration, which is a difference between said third variable and said second variable, with a most recent iteration, which is a difference between said second variable and said first variable;

implementing an action to allow said reorganization to catch up if said next iteration is at least as much as said most recent iteration;

quiescing write access to said old area, while said second variable is set to said third variable;

applying a second log entry with a second log entry RID, wherein said second log entry RID is said old RID, to said reorganized version of said data record identified by said new RID, by using said RID mapping table to translate said old RID to said new RID, while read-only access is retained;

quiescing all access of said table space;

converting access from said old area to said new area;

creating a backup copy of said table space containing said new area;

starting read/write access to said table space containing said new area; and erasing said old area and said RID mapping table.

8. The program storage device according to claim 7, wherein said step of performing reorganization comprises the steps of:

unloading said data record from said old area;

reorganizing said data record;

reloading said reorganized version of data record, except said old RID, in said new area of said table space; and inserting an entry containing said old RID and said new RID into said mapping table during said reloading step.

9. The program storage device according to claim 7, wherein said first and second log entry each comprise a plurality of log entries, and prior to said steps of applying said first and second log entries, further performing the steps of:

sorting pointers to said first and second log entries by said old RIDs;

copying a subset of said first and second log entries;

translating said old RID of each of said first and second log entries to said new RID; and sorting pointers to said translated first and second log entries by said new RIDs.

10. The program storage device according to claim 9, wherein said step of translating by maintaining said mapping table further comprises the steps of:

updating said mapping table for each of said first and second log entries to reflect a state of said reorganized version of said data record; and updating said mapping table for each of said first and second log entries to reflect a type of said log entry.

11. The program storage device according to claim 9, wherein said step of translating by maintaining said mapping table further comprises the step of:

updating a RBA column in said mapping table for said reorganized version of said data record.

12. A computer program product, comprising:

a computer usable medium having a computer readable program code means embodied in said medium for causing a database management system (DBMS) to be reorganized, the computer readable program code means comprising, computer readable program code means for causing a computer to reorganize a data record in an old area of a table space, wherein said data record has an old record identifier (RID), while read/write access to said old area is retained;

computer readable program code means for causing a computer to direct said reorganized version of said data record to a new area in said table space, wherein said reorganized version of said data record has a new RID, while read/write access to said old area is retained;

computer readable program code means for causing a computer to maintain a mapping table that maps between said old RID and said new RID;

computer readable program code means for causing a computer to copy a subset of a log;

computer readable program code means for causing a computer to translate a log entry RID for a log entry to said new RID, wherein said log entry RID is said old RID; and computer readable program code means for causing a computer to apply said translated log entry with said new RID to said reorganized version of said data record in said new area in said table space.

13. The computer program product according to claim 12, wherein said computer readable program code means for causing a computer to reorganize and direct comprises, computer readable program code means for causing a computer to unload said data record from said old area;

computer readable program code means for causing a computer to reorganize said data record;

computer readable program code means for causing a computer to reload said reorganized version of said data record, except said old RID, in said new area; and computer readable program code means for causing a computer to insert an entry containing said old RID and said new RID into said mapping table during said reloading step.

14. The computer program product according to claim 12, wherein when said log entry comprises a plurality of log entries, and said computer program product further comprises:

computer readable program code means for causing a computer to sort said log entries by said old RIDs, prior to said step of translating; and computer readable program code means for causing a computer to sort said log entries by said new RIDs, after said step of translating and prior to said step of applying.

15. The computer program product according to claim 14, wherein said computer readable program code means for causing a computer to translate comprises:

computer readable program code means for causing a computer to calculate an estimated new RID.

16. The computer program product according to claim 12, wherein said computer readable program code means for causing a computer to maintain a mapping table comprises, computer readable program code means for causing a computer to update said mapping table for each said log entry to reflect a state of said reorganized version of said data record, prior to said step of applying said log entry; and computer readable program code means for causing a computer to update said mapping table for each said log entry to reflect a type of said log entry.

17. The computer program product according to claim 12, wherein said computer readable program code means for causing a computer to apply said log entry comprises:

computer readable program code means for causing a computer to update a relative byte address (RBA) column in said mapping table for said reorganized version of said data record.

18. A computer program product, comprising:

a computer usable medium having computer readable program code means embodied in said medium for causing a database management system (DBMS) to be reorganized, the computer readable program code means comprising, computer readable program code means for causing a computer to record a first current relative byte address (RBA) for a log as a first variable, while read/write access to an old area of a table space is retained;

computer readable program code means for causing a computer to perform reorganization Of a data record with an old record identifier (RID) in said old area of said table space such that a reorganized version of said data record has a new RID in a new area of said table space, while read/write access to said old area is retained;

computer readable program code means for causing a computer to store a second current RBA for said log as a second variable;

computer readable program code means for causing a computer to read said first variable;

a computer readable program code means for causing a computer to read said second variable;

computer readable program code means for causing a computer to apply a first log entry including a log entry RID, wherein said log entry RID is said old RID, to said reorganized version of said data record identified by said new RID in said new area by using a RID mapping table to translate said old RID to said new RID, while read\write access to said old area is retained;

computer readable program code means for causing a computer to record a third current RBA for sad foe as a third variable;

computer readable program code means for causing a computer to compare a next iteration, which is a difference between said third variable and said second variable, with a most recent iteration, which is a difference between said second variable and said first variable;

computer readable program code means for causing a computer to implement an action to allow said reorganization to catch up if said next iteration is at least as much as said most recent iteration;

computer readable program code means for causing a computer to quiesce write access to said old area, while said second variable is set to said third variable;

computer readable program code means for causing a computer to apply a second log entry with a second log entry RID, wherein said second log entry RID is said old RID, to said reorganized version or said data record identified by said new RID, by using said RID mapping table to translate said old RID to said new RID, while read-only access is retained;

computer readable program code means for causing a computer to quiesce all access of said table space;

computer readable program code means for causing a computer to convert access from said old area to said new area;

computer readable program code means for causing a computer to create a backup copy of said table space containing said new area;

computer readable program code means for causing a computer to start read/write access to said table space containing said new area; and computer readable program code means for causing a computer to erase said old area and said RID mapping table.

19. The computer program product according to claim 18, wherein said computer readable program code means for causing a computer to perform reorganization comprises, computer readable program code means for causing a computer to unload said data record from said old area;

computer readable program code means for causing a computer to reorganize said data record; and computer readable program code means for causing a computer to reload said reorganized version of data record, except said old RID, in said new area of said table space;

computer readable program code means for causing a computer to insert an entry containing said old RID and said new RID into said mapping table during said reloading step.

20. The computer program product according to claim 18, wherein said first and second log entry each comprise a plurality of log entries, and said article of manufacture further comprises:

computer readable program code means for causing a computer to sort pointers to said first and second log entries by said old RIDs;

computer readable program code means for causing a computer to copy a subset of said first and second log entries;

computer readable program code means for causing a computer to translate said old RID of each of said first and second log entries to said new RID; and computer readable program code means for causing a computer to translate said old translated first and second log entries by said new RIDs.

21. The computer program product according to claim 20, wherein said computer readable program code means for causing a computer to translate by maintaining said mapping table further comprises:

computer readable program code means for causing a computer to update said mapping table for each of said first and second log entries to reflect a state of said reorganized version of said data record; and computer readable program code means for causing a computer to update said mapping table for each of said first and second log entries to reflect a state of said log entry.

22. The computer program product according to claim 20, wherein said computer readable program code means for causing a computer to translate by maintaining said mapping table further comprises:

computer readable program code means for causing a computer to update a RBA column in said mapping table for said reorganized version of said data record.

* * * * *